United States Patent [19]
Melrath

[11] 3,945,344
[45] Mar. 23, 1976

[54] BIRD FEEDER

[76] Inventor: Richard L. Melrath, 946 Longview Road, King of Prussia, Pa. 19406

[22] Filed: Sept. 5, 1974

[21] Appl. No.: 503,258

[52] U.S. Cl. ............................ 119/51 R; 119/23
[51] Int. Cl.² ..................................... A01K 39/00
[58] Field of Search ............ 119/51 R, 52 R, 23, 24, 119/25, 26, 54, 55

[56] References Cited
UNITED STATES PATENTS

| | | | |
|---|---|---|---|
| 2,216,511 | 10/1940 | Copeman | 119/52 R |
| 2,631,567 | 3/1953 | Gilson | 119/52 R |
| 2,666,414 | 1/1954 | Burr et al. | 119/23 |
| 3,250,249 | 5/1966 | Nelson et al. | 119/23 |

Primary Examiner—Louis G. Mancene
Assistant Examiner—Peter K. Skiff

[57] ABSTRACT

A bird feeder comprises a sheet of stiff paper or paper board, folded to form a plurality of inclined walls. The walls incline inwardly toward the top, and are of less breadth at the top than at the bottom. The bird feeder is a house, having a floor and a roof, forming an enclosure in which bird feed is contained. A thin, rigid bird platform surrounds the walls at a level above the bottoms of the walls, and is formed of a shaped piece having an opening permitting the platform to be assembled by movement downwardly over the top of the house, into friction contact with the front, back and sidewalls, and held in place by frictional force at a location above the bottoms of the walls.

In a preferred form, the bird feeder has one or more longitudinally extending perforations, forming openings for movement of the bird feed from inside the house, for access to the birds on the platform.

11 Claims, 4 Drawing Figures

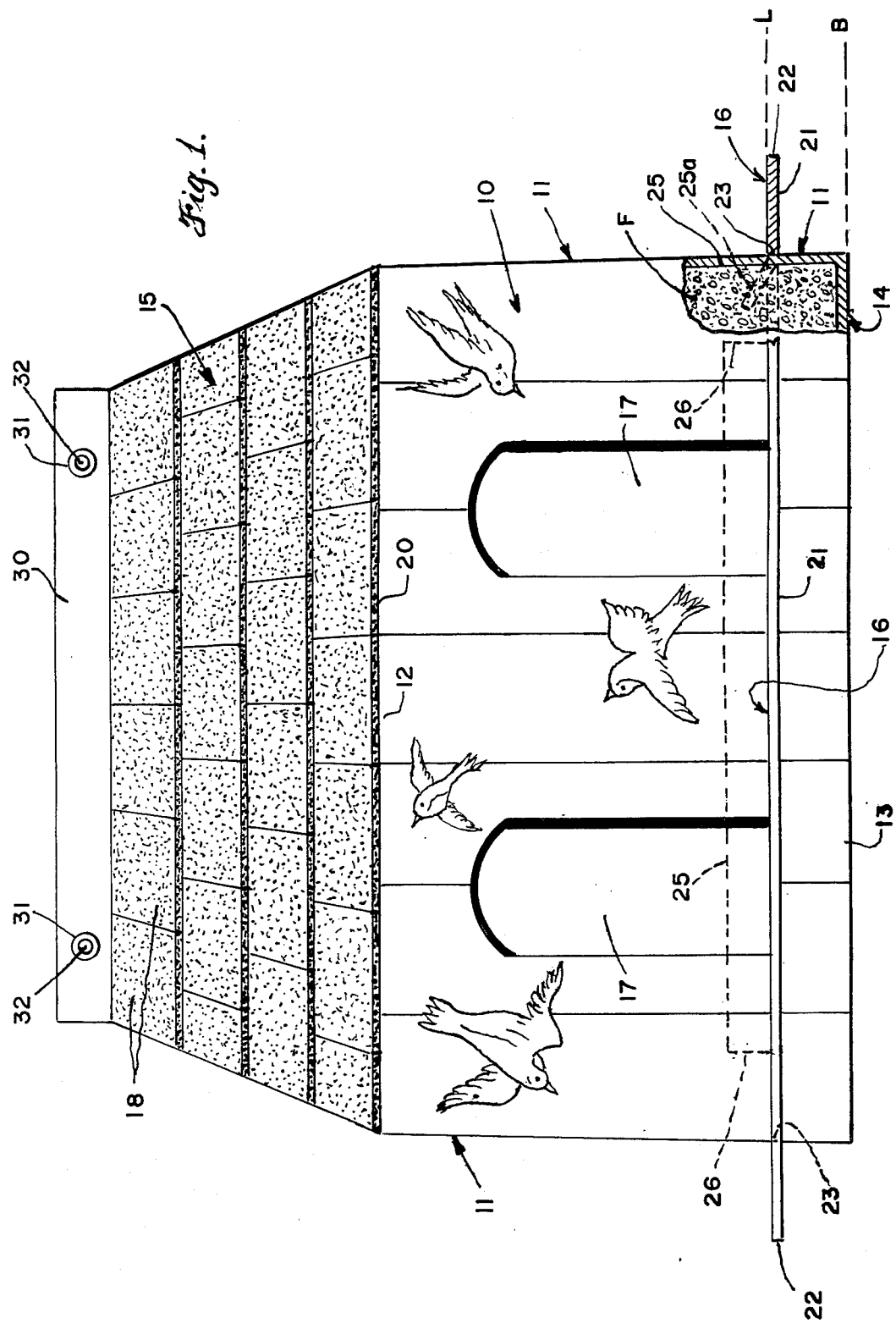

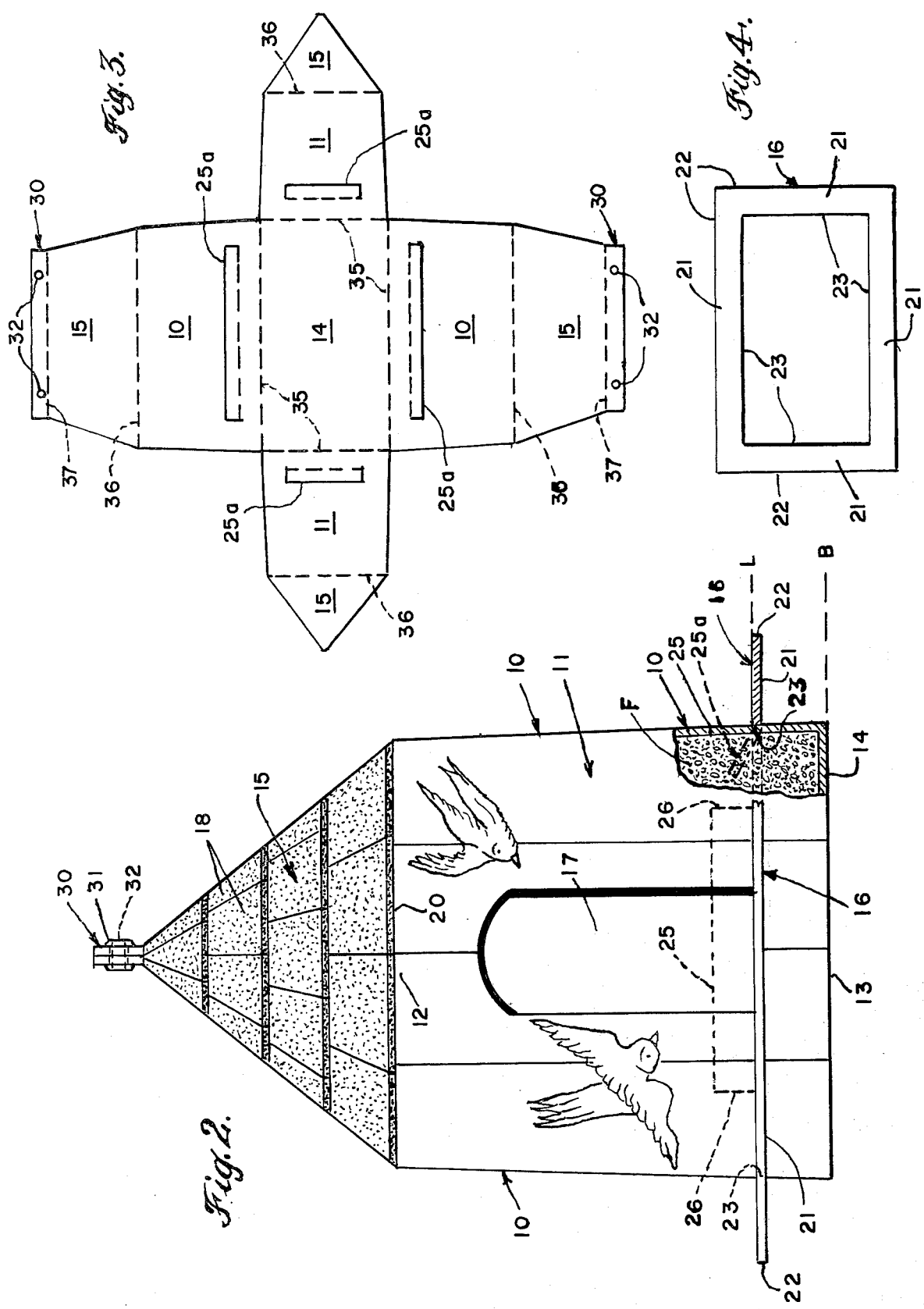

BIRD FEEDER

BRIEF DESCRIPTION OF THE INVENTION

This invention relates to a bird feeder preferably of the throw away type, which is pre-filled with bird feed or seed, and which may be purchased as a self-contained unit complete with bird feed, and may readily be placed in use. This invention further relates to a bird feeder of the type referred to, wherein the bird feed is readily made available and attractive to a wide variety of birds, and wherein the bird feeder after its use has been completed can easily and simply be disposed of and replaced with a fresh, unitary bird feeder.

DESCRIPTION OF THE PRIOR ART

Disposable paper board bird feeders are conceptually old in the art. The use of cardboard or plastic material, similar to that of a milk container for bird feeding structures, appears in the U.S. Pat. Nos. to Woodling 3,354,868, to Lawalin et al, 3,441,002, and to Early 2,891,711 and 2,775,226. Further, some of the foregoing references evidence the gravitational force feed of the bird food through perforated slots or the like, the feed being received by the bird from a receptable, tray or perch.

Further, it is also known to provide bird feeders having outwardly tapered walls, as evidenced by the U.S. design Pat. No. 164,707 to Nissen, and other U.S. Pat. Nos. such as Crouch et al 3,151,600, Frest 1,528,413 and Woodling 3,354,868 additionally suggest replaceable and/or removable ledges upon which the bird may perch. However, none of these references, or any others to the best of my knowledge, disclose or suggest a completely unitary bird feeder which can be purchased at a pet shop or hardware store, for example, as a unitary bird feeder complete with bird feed or seed already charged therein, and which may simply be placed at a suitable outdoor location, and without the need for manipulation or tools, be placed immediately into use and which, after its use has been completed, can be simply discarded and replaced by another unitary bird feeder of the same type. Further, there is a great need in the art for a bird feeder which is highly attractive to birds, makes it easy for the birds to gain access to the food, but which is so simple and so inexpensive to manufacture and to use that it may readily be discarded, just as a typical waxed paper milk carton or the like may be discarded after use.

It is accordingly an object of this invention to provide a unitary bird feeder of the type described, which is extremely attractive to birds and which is so inexpensive that it may readily be discarded after use. Still another object of this invention is to provide such a unitary bird feeder which the owner can readily and quickly place into operation, without requiring complicated manipulations or tools. Other objects and advantages of this invention, including the simplicity and economy of the same, and the ease with which it may be adapted to various locations and perches, will further become apparent hereinafter and in the drawings.

DRAWINGS

FIG. 1 is a front view of a bird feeder structure embodying features of this invention; and FIG. 2 is an end view of the bird feeder appearing in FIG. 1;

FIG. 3 is a developed view, on a reduced scale, of a blank for forming the bird feeder; and FIG. 4 is a plan view of the platform of the bird feeder.

DETAILED DESCRIPTION OF THE INVENTION

Although specific terms will be used in describing the particular form of this invention shown in the drawings, those terms are not intended to limit the scope of the invention, which is defined in the appended claims.

Turning now to the drawings, the bird feeder there shown comprises a front wall 10 and a corresponding back wall, and a side wall 11 together with a corresponding side wall on the opposite side. These walls are tapered inwardly so that their upper edges 12 are shorter than their lower edges 13. Thus, each wall is inclined somewhat inwardly in an upward sense, that is to say, the walls slope downwardly and outwardly toward the base.

The bird feeder also has a floor 14 and a roof 15, forming a house comprising an enclosure in which the bird feed is initially charged. The bottom right-hand corners of FIGS. 1 and 2 have been broken out in order to clearly illustrate the side wall 11, the floor 14 and the bird feed F, contained within the house.

The number 16 designates a piece of thin, rigid material forming a bird platform surrounding the walls at a level L which is above the bottoms B of the walls.

The bird feeder, as shown, may be provided with designs of any desired type, imprinted thereon, such as the designs of doorways 17 and of roofing shingles 18, for example, or drawings of birds, etc.

As will now be clear, each wall of the feeder has a breadth which is greater at the bottom than it is at the top. Further, in a preferred embodiment, the lower edge 20 of the roof 15 is flush with the walls of the house and does not extend outwardly beyond such walls.

It will further be appreciated that the platform 16 comprises a plurality of edge strips 21 connected end to end, each strip having an outer edge 22 and an inner edge 23, the length of each inner edge being less than the breadth of the bottom of the corresponding house wall 11 (at 13) but greater than the breadth of the corresponding house wall 11 at its top 12. In this manner, the platform 16 is frictionally fitted to and supported by the inclined walls 11, at a location L spaced above the bottoms B of the walls.

It will further be observed that each of the walls 11 has a substantially horizontally extending perforation 25 subtended by relatively short, vertical perforations 26, 26 at the ends thereof. With the use of these perforations, the owner of the bird feeder, upon placing it into operation, may simply press upon the wall 11, in the area beneath the perforations 25, to form one or more openings as indicated at 25a in FIGS. 1 and 2 in any desired number of walls 11, thus liberating the bird feed for movement from within the bird feeder for access to the platform 16.

Thus, the platform 16 not only provides the pedestal upon which the birds may perch during the feeding process, but also provides a support for any excess bird feed which flows downwardly and outwardly from within the house.

Accordingly, it will be appreciated that at least one of the walls is perforated in a generally horizontal direction, at a level spaced above the platform 16, providing an opening for releasing the bird feed from within the house, through the wall, above the platform. Desirably all of the walls 11 are so perforated, but this is a matter of choice. Further, although the perforation as shown in the drawings appears as a horizontal perforation having vertical end portions, other geometrical relationships may be utilized instead. Further, as appears in the drawings, it is highly preferred that each perforation should terminate at a location spaced inwardly from the outer edge of the wall, thus preserving the structural integrity of the house itself.

It will be further observed, of course, that the top of the roof includes a vertical portion 30 having typical eyelets 31 surrounding openings 32 which are useful for hanging the bird feeder from any desirable overhead support, such as the branch of a tree, for example.

It will be observed that in FIG. 3, which is a developed view of a cross-shaped blank for forming the bird feeder, a means is shown whereby the bird feeder can be shipped in a knocked-down condition and opened up at a suitable location, such as a pet shop or hardware store for example, after shipment. In the form of the invention shown in FIG. 3 the scores 35, indicated in dark lines, are provided for raising the walls 10 and 11 upwardly. Similarly, scores 36 are provided for angularly folding the roof members 15 inwardly to form the roof. Further, scores 37 are provided for folding the tabs 30 into mating vertical position. The access openings for the feed are indicated at 25a.

FIG. 4 illustrates the bird platform 16, the function of which is fully described above.

It is contemplated to provide the blanks of FIGS. 3 and 4 to constitute the parts of the kit, enabling the proprietor of a pet shop, for example, or even the ultimate user to assemble the bird feeder readily and to insert the desired amount of bird feed in accordance with the present invention.

OPERATION

It will be appreciated that the operation of the bird feeder in accordance with this invention is very simple indeed. It is only necessary to buy a bird feeder as a unitary product, complete with bird feed, which has been placed into the house with the use of modern mass production techniques, which are analogous to those utilized in filling boxes of breakfast cereal, for example. The bird feeder is simply placed on or hung from any desired support, using the eyelets 31, 31 if desired, and one or more of the perforations 25, 26 are opened, liberating the desired quantity of bird feed for consumption by the birds. Indeed, it is highly preferable to construct the walls 11 of a material having a sufficiently limited strength, or to provide the perforations such that they are yieldable to the forces exerted by the birds themselves in seeking their feed. Thus, the birds themselves are capable of assuring a continued supply of feed, by further opening the walls 11 along the lines of perforation, if necessary.

The combination of the outwardly tapered walls and their removable and replaceable ledge or balcony cooperating therewith, are important and advantageous features of this invention. It is highly preferable to package and ship bird feeders in accordance with this invention in a semi-knocked down condition, with the platform 16 separate from but enclosed in the same package with the house itself. In such a case, in order to place the bird feeder into use, the purchaser simply slips the platform 16 downwardly over the top of the house, clearing the edges of the roof and the upper edges of the walls 11, and slips the platform 16 downwardly until its inner edges 23 contact and frictionally grip the outer surfaces of the walls 11 at a level L, which is spaced slightly above the level B at the bottoms of the walls 11.

Although this invention has been disclosed in connection with one specific form thereof, it will be appreciated that a wide variety of changes may be made without departing from the spirit and scope of the invention. For example, certain parts may be reversed, certain features may be used independently of other features, and equivalent elements may be substituted for those specifically shown and described in this specification, all without departing from the spirit and scope of the invention as defined in the appended claims.

The following is claimed:

1. A bird feeder comprising a flat floor having a plurality of sides, a corresponding plurality of walls of stiff sheeting material which are inclined inwardly toward the top, said walls forming the walls of a house and being secured at their bases to the respective sides of said floor, said walls at a predetermined distance above said floor having respective integral roof portions foldably inclined inwardly and upwardly and interengageable for forming a roof, to form an enclosure in which bird feed is contained, a piece of thin, rigid material forming a bird platform surrounding said walls at a level above the bottom of said walls, and means for providing feed to the outside of the enclosure.

2. The bird feeder defined in claim 1, wherein each said wall has a breadth which is greater at the bottom than it is at the top.

3. The bird feeder defined in claim 1, wherein said platform comprises a plurality of angularly related edge strips connected end to end, each strip having an outer edge and an inner edge, and the length of each inner edge being less than the breadth of the bottom of the corresponding house wall but greater than the breadth of the corresponding house wall at its top.

4. The bird feeder defined in claim 1, wherein said means for providing feed includes a perforation in at least one of said walls in a generally horizontal direction, at a level spaced above said platform, providing an opening for releasing said bird feed from within said house through said wall above said platform.

5. The bird feeder as defined in claim 4, wherein all of said walls are so perforated.

6. The bird feeder defined in claim 4, wherein said perforation has vertical end portions.

7. The bird feeder defined in claim 4, wherein said perforation terminates at a location spaced inwardly from the outer edge of said wall.

8. The bird feeder defined in claim 1, wherein said platform is a one-piece material having an outer periphery corresponding to but larger than the periphery of said house, measured at the bottoms of said walls, and having an inner periphery corresponding to the periphery of a section of said house measured at a location spaced above the bottoms of said walls.

9. The bird feeder defined in claim 1, wherein said platform is frictionally fitted to and supported by said inclined walls at a location spaced above the bottoms of said walls.

10. The bird feeder defined in claim 1, wherein a pair of said roof portions are opposite each other and have upwardly foldable extensions matingly engageable with each other, and wherein means are provided for securing said extensions to each other in engaged position and for suspending said bird feeder from an overhead support.

11. The bird feeder defined in claim 1, wherein said enclosure is formed from a unitary blank comprising a flat cross-shaped sheet of stiff paper sheeting, said blank having a rectangular central portion constituting said floor, and wherein the arms of the cross extend from the sides of said central portion and are upwardly foldable at their intersections therewith to form said walls.

* * * * *